United States Patent [19]

Klein et al.

[11] 4,417,151
[45] Nov. 22, 1983

[54] UNIVERSAL INPUT-OUTPUT DEVICE

[75] Inventors: George Klein, Manhasset Hills; Solomon Manber, Sands Point, both of N.Y.; Marvin Sudhalter, North Bergen, N.J.; Alvin Taylor, Bayside, N.Y.

[73] Assignee: Distributed Control Systems, Inc., Great Neck, N.Y.

[21] Appl. No.: 357,058

[22] Filed: Mar. 11, 1982

[51] Int. Cl.³ ............................................. H02J 1/10
[52] U.S. Cl. ................................ 307/24; 324/73 R; 307/31; 371/20
[58] Field of Search .................. 307/24, 31, 42, 43, 307/52, 126, 140; 324/73 R, 73 AT; 371/20; 364/580

[56] References Cited
U.S. PATENT DOCUMENTS 3,597,682  8/1971  Hubbs et al.
3,976,940  8/1976  Chou et al. ................ 371/20 X
4,092,589  5/1978  Chou et al. ................ 371/20 X
4,195,769  4/1980  Elios et al. ................ 324/73 R X
4,280,220  7/1981  Vaeches ..................... 324/73 R X Primary Examiner—Elliot A. Goldberg
Assistant Examiner—Derek Jennings
Attorney, Agent, or Firm—Hane, Roberts, Spiecens & Cohen

[57] ABSTRACT

A universal input-output apparatus has: a controllable source of electrical energy including at least one drive source having an output terminal and a return terminal; an electrical energy measuring device including at least one energy sensor having an input terminal connected to the output terminal of the controllable source of electrical energy; a twin leaded line having the first ends thereof connected to the output and return terminals of the drive source, respectively; and an integrity tester in the form of a zener diode connected across the second ends of the first and second leads, respectively, a first terminal connected to one of the second ends, a second terminal connected via a unidirectional conductor to the one second end and a third terminal connected via a resistive device to the one second end.

8 Claims, 4 Drawing Figures

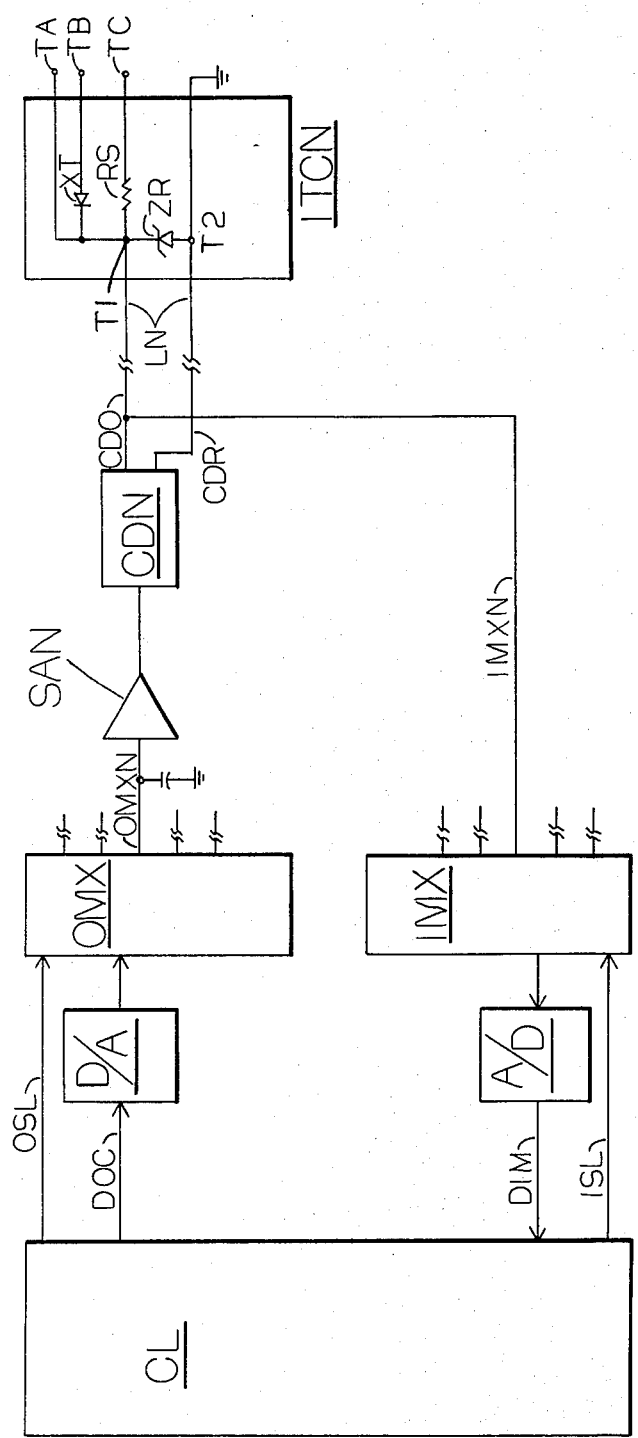
FIG. 1
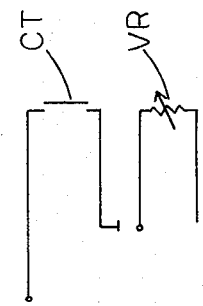
FIG. 2C
FIG. 2B
FIG. 2A

UNIVERSAL INPUT-OUTPUT DEVICE

BACKGROUND OF THE INVENTION

This invention pertains to input-output devices and, more particularly, to such devices which can connect a central station to a plurality of different remote stations.

Universal controls have many applications. Particularly important applications today concern the control of energy, airconditioning, lighting and processing. Because of the accelerating cost of fuel, it is becoming more and more necessary to practice energy conservation in commercial, industrial and public buildings. This conservation takes place by controlling the lighting, heating, ventilation and air-conditioning in different areas of the building on a purely on-demand basis. To perform this function, there is distributed throughout the building sensors which determine the ambient conditions of the particular zones in the building. Also within the zones there are devices for controlling the lighting in the zone as well as devices for supplying heat and air conditioning. Since the zones are diffused throughout the building, there is generally provided a central control connected by means of wires to the sensors and operable devices in the diffused zones. Heretofore, such systems were custom-made and used a jigsaw puzzle assemblage of devices at the remote terminals. This approach is not only expensive, but is difficult to troubleshoot and monitor.

SUMMARY OF THE INVENTION

It is a general object of the invention to provide an improved input-output apparatus which is universally applicable throughout a multizone array. Briefly, the invention contemplates universal input-output apparatus having a controllable source of electrical energy including at least one drive source with an output terminal and a return terminal. There is also provided an electrical energy measuring means including at least one energy sensing means having an input terminal connected to the output terminal of the controllable source of electrical energy. In addition, there is at least one line having first and second leads with first ends connected to the output and return terminals of the drive source, respectively. To the other end of these leads is connected at least one integrity test means having a zener diode means connected across the second ends of the first and second leads, respectively. The test means also has a first terminal connected to one of the second ends, a second terminal connected via a unidirectional conducting means to such second end, and a third terminal connected via a resistor means also to such second end of the line. To these terminals of the integrity test means can be connected either devices for receiving electrical energy in either a digital or analog form, or there can be connected devices thereto which send back information to the energy sensing means.

BRIEF DESCRIPTION OF THE DRAWING

Other objects, the features and advantages of the invention will be apparent from the following detailed description when read in conjunction with the accompanying drawing which shows the presently preferred embodiment of the invention. In the drawing:

FIG. 1 shows a block diagram of the apparatus for practicing the invention; and

FIG. 2 shows devices which can be connected to the apparatus of FIG. 1.

DETAILED DESCRIPTION OF THE PREFERRED EMBODIMENT OF THE INVENTION

In FIG. 1 there is shown a control logic CL which can be coupled to a plurality of external devices via a universal input-otput circuit according to the invention. The control logic CL is connected via the multiline cable and a digital to analog converter D/A to an output multiplexor OMX. The control logic CL can send a digital value representing, say, an analog voltage, to the input of the digital analog converter D/A which, in turn, emits an analog voltage level to the input of the output multiplexor OMX. At the same time, the control logic CL will emit an address signal via the output select lines OSL to the control input of the multiplexor OMX. In response thereto, the multiplexor OMX will connect its input terminal to one of its output terminals. At the same time, the control logic CL will also emit an address signal on the input select lines ISL to the addressing input of the input multiplexor IMX. In response thereto, the multiplexor IMX connects one of its input lines to the input of the analog to digital converter A/D whose output is a cable of lines DIM. At this point, the control logic CL is connected to a particular device so as to both send and receive digital signals thereto and from.

More particularly, each of the output lines of the output multiplexor OMX is connected to its own sample and hold amplifier SAN. The output of the sample and hold amplifier SAN is connected to the input of a current driver CDN which has an output terminal CDO and a return terminal CDR. The output terminal CDO and the return terminal CDR are connected to first ends of a line LN whose second terminals are connected to an integrity test circuit ITCN. The integrity test circuit ITCN is connected to a remote external device, as will hereinafter become apparent. In addition, the output terminal CDO of the current driver CDN is connected to the input terminal IMXN of the input multiplexor IMX. In this way, a particular external device N is connected to the control logic CL. It should be realized that the letter N represents a generalized external device and its connections. Therefore, if there are 48 external devices, the multiplexor OMX will have 48 output terminals each connected via its respective sample and hold amplifier, and current driver to a particular integrity test circuit. In addition, the output terminal of the particular current driver is also connected to an associated input terminal of the multiplexor IMX.

An integrity test circuit has first and second terminals connected via its associated line LN to the output and return terminals of its associated current driver CDN. Across the terminals T1 and T2, there is connected a zener diode ZR. There is connected to the terminal T1, three terminals TA, TB and TC. The terminal TA is directly connected to the terminal T1; the terminal TB is connected via the diode XT, and the third terminal TC is connected thereto via the resistor RS. One of the terminals TA, TB and TC will be used for connection to the external device.

The terminal to be used is determined by the external device. For example, in FIG. 2 there is the type of devices that can be connected to terminal TA. One device is an analog device such as a variable speed motor. Another device is a digital device such as a relay or solenoid. The terminal TB is usually connected to a variable voltage source such as shown schematically in FIG. 2B. Such variable voltage sources are generally of the analog type. In FIG. 2C are shown the devices normally connected to terminal TC. These are passive devices which can be digital as represented by the contact set CT or analog, as represented by the variable resistor VR. The operation of the apparatus will now be described.

During an output operation, i.e., when signals are being fed from the control logic CL to an external device, the control logic CL emits an addressing signal on the line of cable OSL which selects a particular output of the output multiplexor OMX. At the same time, the control logic emits a digital word to the digtital to analog converter D/A which converts this to an analog signal fed to the input of the output multiplexor OMX. The output of the multiplexor is fed via the sample and hold circuit SAN to the current driver CDN where it is fed to the integrity test circuit ITCN of the associated external device. At the same time, the integrity of this line is being tested since the output of the current driver CDN is connected to the corresponding input IMXN of the input multiplexor IMX. The input multiplexor IMX feeds this signal to the analog to digital converter A/D which converts it to a digital value. Within certain tolerances, the digital value fed from the control logic on the lines DOC should agree with the digital value received by the control logic on the lines of cable DIM. It should be noted that if the device is a digital device, then the control logic would either send out a very large digital number or a very small digital number, establishing the two on-off conditions. It should also be noted that sample and hold amplifiers and current drivers are used to that continuous signals can be fed to the devices while using only one digital to analog converter. However, it will be necessary to periodically "refresh" the sample and hold amplifiers.

For input conditions, i.e., when the control logic is sampling the status of the external devices, the control driver of the device being sampled is effectively shut off and only the input multiplexor and analog to digital converter are operative. This occurs when the test device can self-generate a voltage or current. If the device under test is a passive device, then the current drive is set such that a known input voltage will result in a known output condition.

The integrity test circuit operates as follows: if the external device under test is one that is to be voltage energized, then it is connected to terminal TA. The zener diode voltage is selected to be above the normal energization voltage for this device, but well below the supply voltage of the system. For example, if the normal voltage expected across terminals T1 and T2 is between, say, zero and ten volts and the supply voltage is fifteen volts, then the zener voltage can be selected at twelve volts. During the test, the voltage at the terminal T1 is fed to the input multiplexor. If the circuit and device are intact, the expected voltage will be read. If the device is short-circuited or even the lines to the test circuit short-circuited, then the measured voltage will be zero. If the connected circuit is open, then the zener diode voltage will be read. Since this diode voltage is above the normal maximum voltage, a fault will be indicated. If the line LN is open circuited then the power supply voltage will be read. For input devices, i.e., where the external device is feeding a signal back to the control logic, the type of device must be known. If the device is one that self-generates a voltage such as in FIG. 2B, it is connected to terminal TB. During the test condition, the current driver CD is turned on to a maximum momentarily and the diode XT is back-biased effectively cutting the input voltage source out of the measured circuit. If the circuit of the ITCN is intact, then the measured voltage will be the zener voltage. If the connected circuit is open, then the power supply voltage will be read. For non-self-generated voltage input circuits, such as shown in FIG. 2C, connection is made to terminal TC. Under normal conditions, the current driver CD is set to supply current as described above. During the test, the current driver is momentarily commanded to a maximum output. The resistor RS is of such value that even if the input circuit being sensed is set to the short-circuiting condition, the current through this resistor will raise the voltage across it to the zener voltage. If the connected wires are short-circuited, then the measured voltage will be zero. If the connected wires are intact, then the zener voltage will be measured. If the connected wires are open, then the power supply voltage will be measured.

A controllable source of electrical energy defined as including at least one drive source having an output terminal and a return terminal. Such controllable source can be for instance a digital-to-analog converter DIA, a output multiplexor OMX, a sample and hold circuit SAN and a current driver CDN.

What is claimed is:

1. A universal input-output apparatus comprising: a plurality of controllable sources of electrical energy including at least one drive source having an output terminal and a return terminal; an electrical energy measuring means including at least one energy sensing means having an input terminal connected to the output terminal of one of said controllable sources of electrical energy; at least one line having a first lead and a second lead and having the first ends of said first and second leads connected to the output and return terminals of said drive source, respectively; and at least one integrity test means comprising a zener diode means connected across the second ends of said first and second leads respectively; a first terminal connected to one of said second ends, a second terminal, unidirectional conducting means interconnecting said one second end and said second terminal, a third terminal, and resistive means interconnecting said one second end and said third terminal.

2. The universal inout-output apparatus of claim 1 wherein said plurality of controllable sources of electrical energy comprises a plurality of said drive sources, wherein there are a plurality of said integrity test means, and wherein there are a plurality of said lines, each of said lines connecting a different one of said integrity test means to a different one of said drive sources, respectively.

3. The universal input-output apparatus of claim 2 wherein said plurality of controllable sources of electrical energy comprises a voltage source and a multiplexor means having an input connected to said voltage source and a plurality of outputs each connected to one of said drive sources.

4. The universal input-output device of claim 3 wherein each of said drive sources comprises a sample and hold means having an input connected to one of the outputs of said multiplexor means and an output and a current driver having an input connected to the output of said sample and hold amplifier and output means connected to the output and return terminals of the associated drive source.

5. The universal input-output device of claims 3 or 4 wherein said voltage source comprises a source of digital values and a digital-to-analog converter means having an input connected to said source of digital values and output connected to the input of said multiplexor means.

6. The universal input-output device of claim 4 wherein said sample and hold means are periodically refreshed.

7. The universal input-ouput device of claim 5 wherein said electrical energy measuring means comprises another multiplexor means having a plurality of input terminals and an output, each of said input terminals being connected to the output terminal of a different one of said drive sources and utilization means connected to the output of said other multiplexor means.

8. The universal input-output device of claim 7 wherein said utilization device comprises an analog-to-digital converter means having an input connected to the output of said other multiplexor means and an output, and digital utilization means connected to the output of said digital-to-analog converter means.

* * * * *